United States Patent [19]
Utsunomiya

[11] Patent Number: 6,072,662
[45] Date of Patent: *Jun. 6, 2000

[54] MAGNETIC HEAD SLIDER WITH U-SHAPED AND/OR V-SHAPED PORTIONS

[75] Inventor: Motoyasu Utsunomiya, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/869,445

[22] Filed: Jun. 5, 1997

[30] Foreign Application Priority Data

Jun. 10, 1996 [JP] Japan ................................. 8-147605

[51] Int. Cl.⁷ ....................................................... G11B 5/60
[52] U.S. Cl. ............................................................ 360/103
[58] Field of Search ............................... 360/103; 384/8, 384/12, 100, 122

[56] References Cited

U.S. PATENT DOCUMENTS

| | | | |
|---|---|---|---|
| 5,406,432 | 4/1995 | Murray | 360/103 |
| 5,606,476 | 2/1997 | Chang et al. | 360/103 |
| 5,704,715 | 1/1998 | Chang et al. | 384/12 |

FOREIGN PATENT DOCUMENTS

| | | | |
|---|---|---|---|
| 61-160885 | 7/1986 | Japan | 360/103 |
| 63-138580 | 6/1988 | Japan | 360/103 |
| 3-30229 | 4/1991 | Japan . | |
| 4-32081 | 2/1992 | Japan | 360/103 |
| 4-341985 | 11/1992 | Japan . | |

*Primary Examiner*—William R. Korzuch
*Attorney, Agent, or Firm*—Hayes, Soloway, Hennessey, Grossman & Hage PC

[57] ABSTRACT

In a flying type magnetic head slider which has an air bearing surface and flies over a magnetic disk surface on an air film bearing, two rail portions having a U-shape and/or V-shape are formed on the air film bearing surface. These rail portions are in upstream and downstream sides of the air flow, respectively. Each rail is arranged such that its convex portion faces an air upstream side and a recessed region is formed in an air downstream side. By producing negative pressure in at least two recessed regions defined by the rail portions, variations in flying height at a position on a recording medium are suppressed. Further, by changing the depths of each recessed portion, the negative pressure is controlled and variations in pitch angle and roll angle are suppressed.

25 Claims, 15 Drawing Sheets

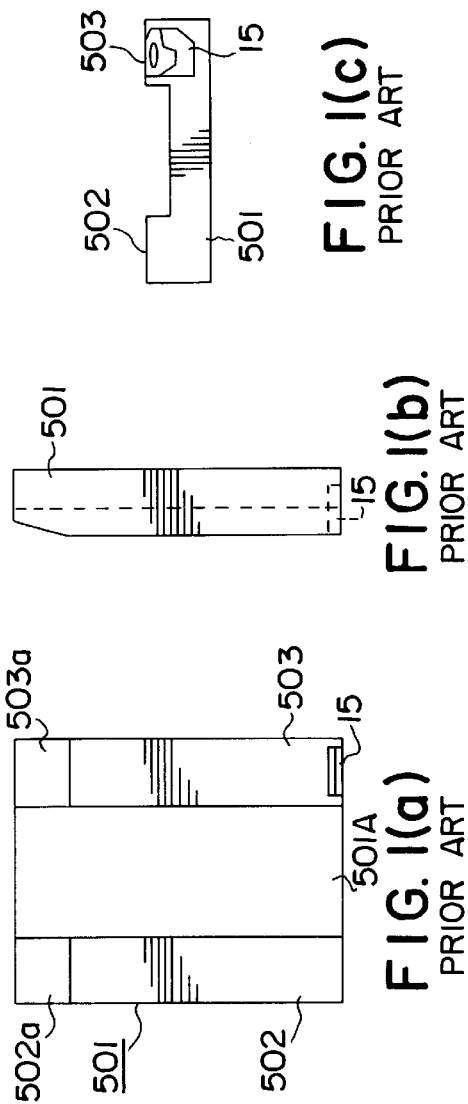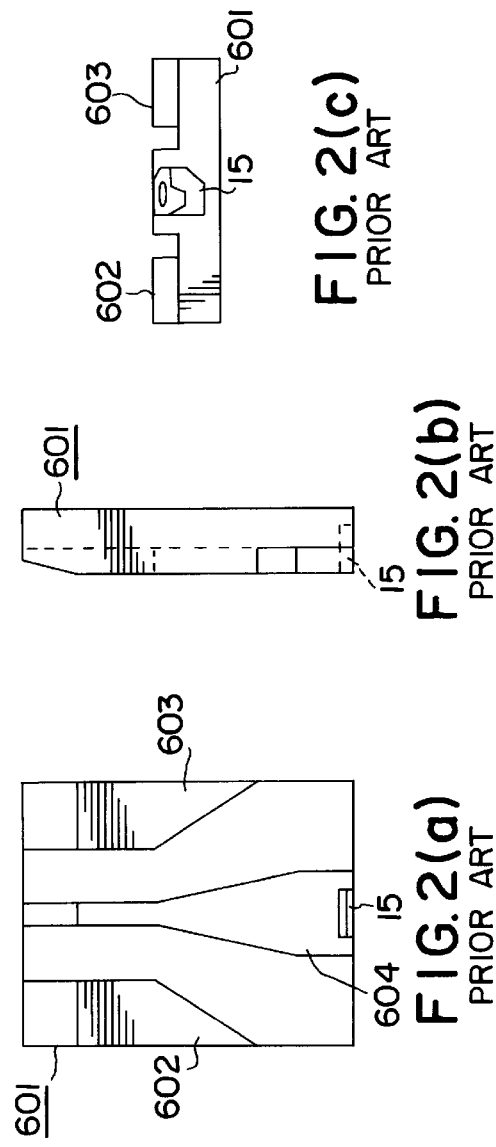

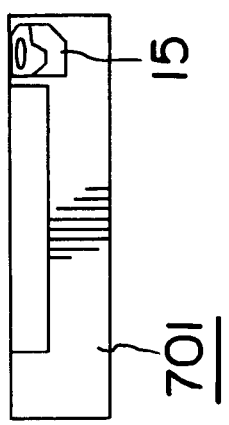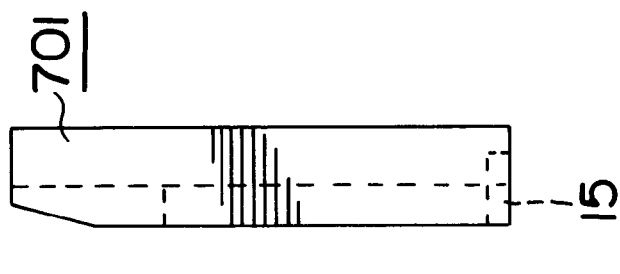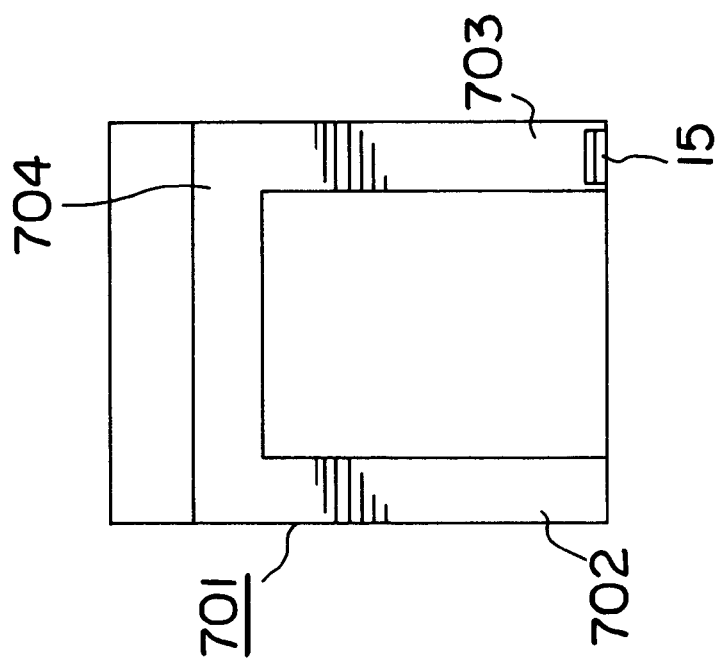
FIG. 3(c) PRIOR ART
FIG. 3(b) PRIOR ART
FIG. 3(a) PRIOR ART

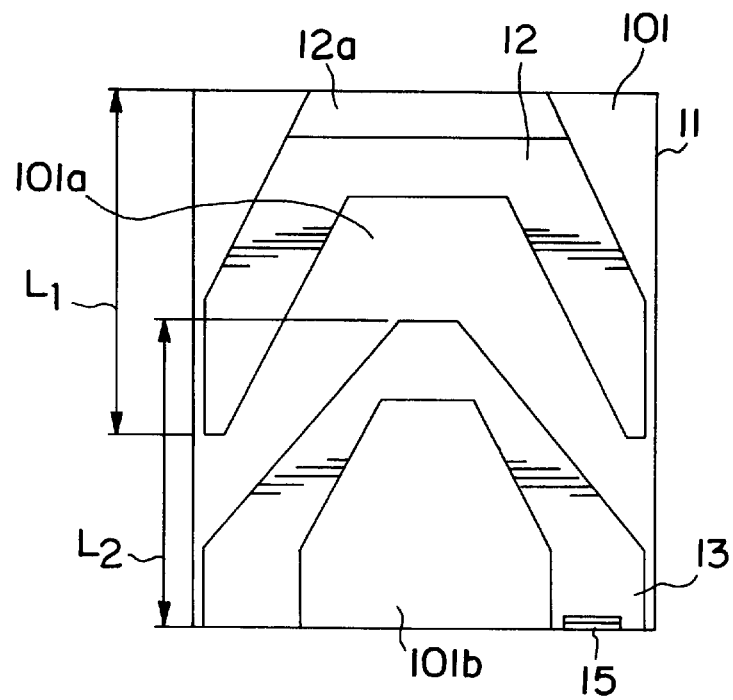
F I G. 6(a)
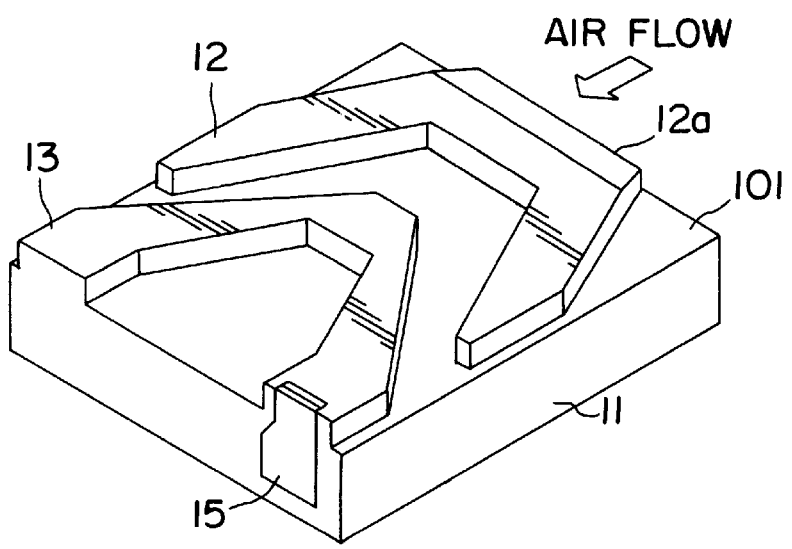
F I G. 6(b)

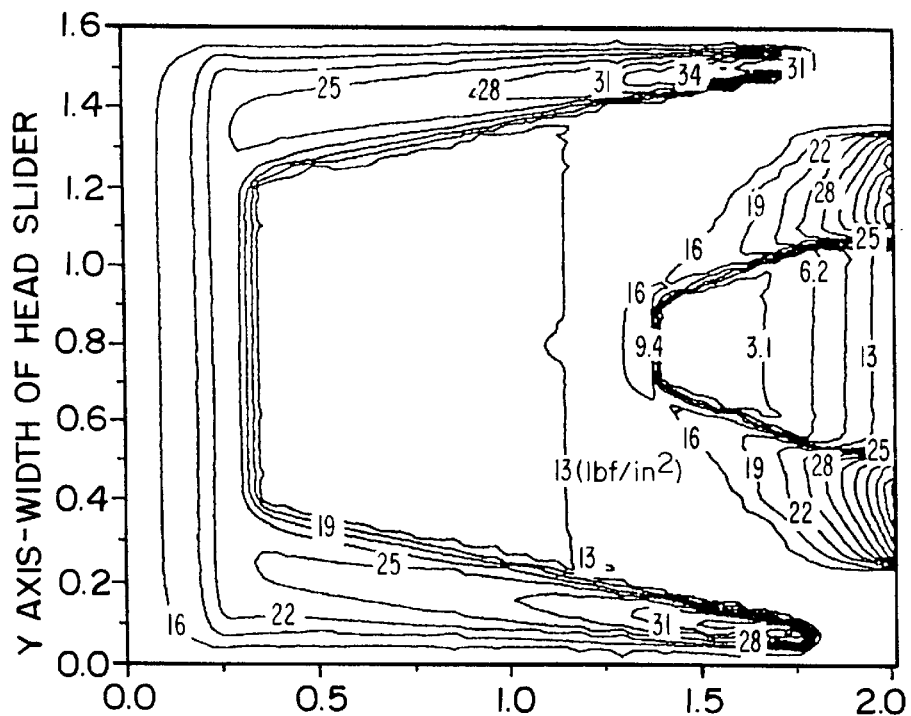
FIG. 9 X AXIS-LENGTH OF HEAD SLIDER
(PERIPHERAL SPEED: 5m/s)
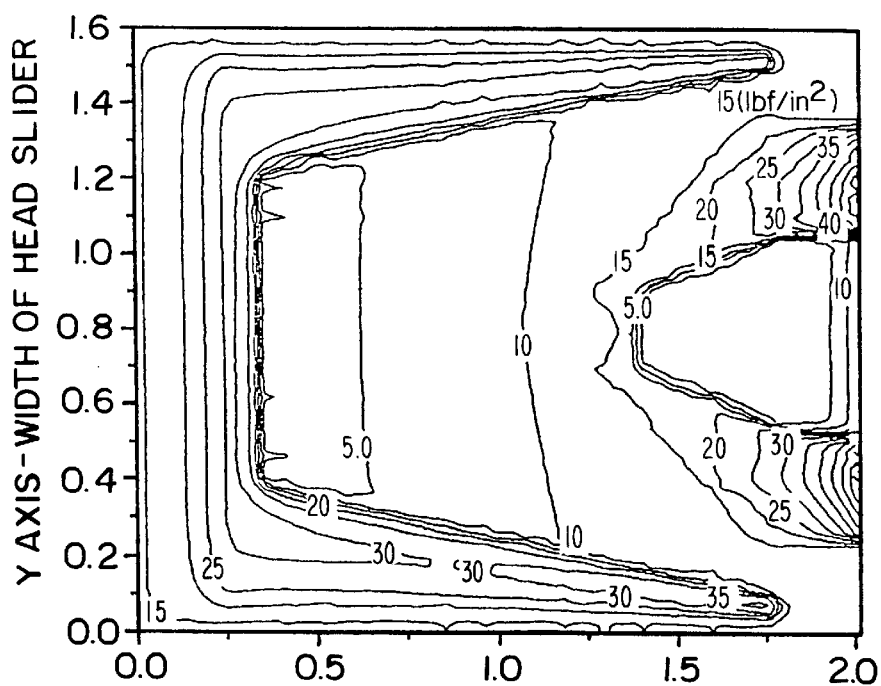
FIG. 10 X AXIS-LENGTH OF HEAD SLIDER
(PERIPHERAL SPEED: 40m/s)

MAGNETIC HEAD SLIDER WITH U-SHAPED AND/OR V-SHAPED PORTIONS

BACKGROUND OF THE INVENTION

1. Field of the Invention

The present invention relates to a magnetic head slider to read/write information while flying above a rotating recording medium at a minute distance therefrom utilizing an air film bearing.

2. Description of the Related Art

In a magnetic disk device used for an external memory device of a computer, reading/writing of information is performed by a magnetic head slider flying at a substantially constant distance above a recording medium. This magnetic head slider receives an air viscosity flow produced by rotation of the recording medium with an air film bearing surface provided on a plane facing the recording medium. The magnetic head slider flies above the recording medium due to the effect of an air film bearing.

A magnetic head is provided to an end portion on an air downstream side of the air film bearing surface. The magnetic head includes a gap which faces the recording medium, and the magnetic head performs reading/writing of information from/to the recording medium while being maintained at a substantially constant distance above the upper surface of the recording medium.

Some examples of such flying type magnetic head sliders are disclosed as examples in Japanese Patent Publication No. 3(91)-30229 and Japanese Patent Laid-Open Publication No. 4(92)-341985. The constructions of such magnetic head sliders will be described with reference to FIGS. 1 to 5 in detail.

FIGS. 1(*a*), 1(*b*) and 1(*c*) show a two-rail slider 501 having two parallel rail portions (side rails) 502 and 503 disposed at the sides of an air film bearing surface. FIGS. 2(*a*), 2(*b*) and 2(*c*) show a three rail slider 601 having two parallel rail portions (side rails) 602 and 603 disposed at the ends of an air film bearing surface and one center rail 604 disposed there-between. FIGS. 3(*a*), 3(*b*) and 3(*c*) show a negative pressure slider 701 having two parallel rail portions (side rails) 702 and 703 disposed at the ends of an air film bearing surface and a reverse step surface 704 formed on the air bearing surface. In these figures, reference numeral 15 denotes the magnetic head.

Next, the constitution of the two-rail slider 501 shown in FIG. 1(*a*), 1(*b*) and 1(*c*), which is a flying type magnetic slider, will be specifically described.

FIG. 4 is a perspective view of the two-rail slider 501. In the two-rail slider 501, which is a flying type magnetic slider, a recessed region 501A with a constant width is provided along the longitudinal direction of the slider 501. On both sides of the recessed region 501A, the two rail portions (side rails) 502 and 503 are provided running parallel to each other along a direction (shown by the arrow e) of an air viscosity flow produced by later described rotations of the recording medium. Air inlet tapered planes (tapered portions) 502A and 503A are provided at the respective upstream or leading ends of the two rail portions (side rails). Further, at an air downstream or trailing end of one rail portion 503, is attached a magnetic head 15 which reads/writes information.

When the magnetic disk storage is not in motion, the two-rail slider 501 is pressed toward the surface of the recording medium at a constant load by an elastic force produced by a load beam (not shown). When the magnetic disk storage is in motion, air viscosity flow produced by the rotation of the recording medium enters along the side rails 502 and 503 from the tapered portions 502A and 503A formed at the upstream end of the magnetic head slider 500, whereby an air film is formed between the recording medium and the air film bearing surface of the two-rail slider 501. The two-rail slider 501 is floated by this air film. This method is called a CSS method (Contact Start Stop method).

The above description was made using the two-rail slider 501 shown in FIG. 1 as an example. The sliders 601 and 701 shown in FIGS. 2 and 3 fly according to the same principle as that in the case of the slider 501.

FIG. 5 is an explanatory view showing the position of a magnetic head slider 500, which is the general term for the sliders 501, 601 and 701, at the time of accessing data. As shown in FIG. 5, the magnetic head slider 500 is fixed to one end of a positioning mechanism 511. The positioning mechanism 511 adopts a rotary actuator method in which a rotary motion is performed in a direction shown by an arrow f or a reverse direction along the surface of the recording medium 100 around a supporting point which is the other end of the mechanism 511. As the positioning mechanism 511 performs a rotary motion, the magnetic head 15 of the magnetic head slider 500 (see FIGS. 1 to 4) performs a seek operation from an inner peripheral side to an external peripheral side and vice versa. Thus, the magnetic head slider 500 is scanned (seek operation) over the recording medium by the positioner mechanism 511 and is positioned on a desired track in the recording medium 100.

However, when the magnetic head slider 500 performs the seek operation ranging from the innermost lap A of the track to the outermost lap B thereof for data accessing, the flying height and flying angle (pitch angle and roll angle) of the magnetic head slider 500 vary according to the position of the recording medium in the radial direction. This results in a change of pressure distribution produced on the air film bearing surface because the air flow speed and yaw angle ($\theta$ in and $\theta$ out, an angle between a tangent line direction to a rotation direction of the recording medium and a longitudinal direction of the magnetic head slider 500) depend on the relative radial position of the recording medium.

When the flying height of the magnetic head slider 500 is not constant, the electromagnetic conversion efficiency of the magnetic head 15 deteriorates. For this reason, in a magnetic disk storage in which high recording density is required, the flying height must be always uniform all over the track.

Further, if the flying angle (pitch angle and roll angle) of the magnetic head slider 500 vary, head hitting, in which magnetic head slider 500 partially touches the recording medium, may occur when the flying height of the magnetic head slider 500 is low. Therefore, it is requires that the magnetic head slider maintain a stable flying angle all over track regions.

Furthermore, as described above, the method adopted is the Contact Start Stop method. And in this method, when the magnetic disk storage set in motion, magnetic head slider 500 which is pressed toward the surface of the recording medium by the load beam receives an air flow produced by the rotation of the recording medium through its leading edge tapered planes (tapered portions) 502A and 503A, it stands up, slides on the surface of the recording medium, completely separates from the surface of the recording medium and flies when the rotation speed of the recording medium reaches more than a predetermined value. From the standpoint of reliability, i.e. the H.D.I (Head-Disk Interface) reliability with regard to a proper flying position of the magnetic head relative to the recording medium, it is desirable that the sliding time of magnetic slider 500 should be as short as possible. To achieve this, it is necessary to set the flying angle large at low speed regions to improve take-off characteristics.

SUMMARY OF THE INVENTION

The object of the present invention is to provide a magnetic head slider capable of performing CDR (constant density recording) all over a disk, by controlling variations in the flying height, irregardless of position, which is capable of ensuring a constant flying height over all track regions and which has improved flying characteristics at low speed regions, thereby improving operation stability and reliability. In order to achieve the foregoing object, the magnetic head slider of the present invention comprises an air film bearing surface facing a recording medium and at least two rail portions having a U-shape or V-shape formed on the air film bearing surface. Each of the U-shape or V-shape rail portions is disposed such that its convex portion faces an air upstream side and its concave portion faces an air downstream side. Further, the U-shape or V-shape rail portions are formed on the air upstream side and the air downstream side of the air film bearing surface, respectively, and are arranged such that they art substantially perpendicular to the air flow.

With such construction, a negative pressure occurs in the portion surrounded by the U-shape or V-shape rail portions (recessed portions). This negative pressure increases with an increase in air flow speed, whereby the frequency dependency of the flying height is reduced an uniformity of flying of the magnetic head slider is enhanced.

Further, each of the recessed regions may have different depths in a plate thickness direction, respectively. This permits an adjustment to make the uniformity of flying of the magnetic head slider more stable.

Further, the recessed region on the leading edge side can have its depth in a plate thickness direction deeper than in the recessed region on the trailing edge side. If the recessed region is shallow, the negative pressure is comparatively large at low speed. If the recessed region is deep, the negative pressure is comparatively large at high speed and small at low speed. Utilizing such characteristics, uniformity of flying of the magnetic head slider can be further enhanced.

Furthermore, a construction may be adopted wherein there is provided a connecting rail portion to connect the rail portion on the leading edge side with the rail portion on the trailing edge side. In this case, there are provided three negative pressure portions, whereby distribution of the negative pressure is more uniform and the distribution thereof is balanced. Therefore, the dependency of flying height on peripheral speed can be reduced. Even at a location at the outer periphery of the track where the yaw angle is large, the negative pressure is distributed evenly so that variations in the flying roll angle of the slider body can be suppressed.

The above mentioned U-shape or V-shape rail portions can be also constituted such that their corner portions such as end portions and bent portions are formed in a rounded curved surface. In such case, turbulence of the air flow tends not to occur.

For a more complete understanding of the present invention and the advantages thereof, reference is now made to the following description taken in conjunction with the accompanying drawings.

BRIEF DESCRIPTION OF THE DRAWINGS

FIGS. 1(*a*), 1(*b*) and 1(*c*) are views showing a first conventional example of a magnetic head slider. Specifically, FIG. 1(*a*) is a plan view from an air bearing surface side, FIG. 1(*b*) is a right side view of FIG. 1(*a*), and FIG. 1(*c*) is a front view of FIG. 1(*a*).

FIGS. 2(*a*), 2(*b*) and 2(*c*) are views showing a second conventional example of a magnetic head slider. Specifically, FIG. 2(*a*) is a plan view from an air film bearing surface side, FIG. 2(*b*) is a right side view of FIG. 2(*a*) and FIG. 2(*c*) is a front view of FIG. 2(*a*).

FIGS. 3(*a*), 3(*b*) and 3(*c*) are views showing a third conventional example of a magnetic head slider. Specifically, FIG. 3(*a*) is a plan view from an air film bearing surface side, FIG. 3(*b*) is a right side view and FIG. 3(*c*) is a front view of FIG. 3(*a*).

FIGS. 6(*a*) and 6(*b*) are views showing a first embodiment of a magnetic head slider of the present invention. Specifically, FIG. 6(*a*) is a plan view from an air film bearing surface side, and FIG. 6(*b*) is a perspective view of FIG. 6(*a*).

FIG. 9 is an explanatory view showing pressure distribution generated on the air film bearing surface at a peripheral speed of 5 m/s.

FIG. 10 is an explanatory view showing pressure distribution generated on the air film bearing surface at a peripheral speed of 40 m/s.

FIG. 19(a) is an explanatory view in case where a slider is positioned in an internal periphery of a track (the yaw angle is −4 degrees) and FIG. 19(b) is an explanatory view in case where the slider is positioned in an outer periphery of the track (the yaw angle is +19 degrees).

DETAILED DESCRIPTION OF THE PREFERRED EMBODIMENTS

Figure 4:
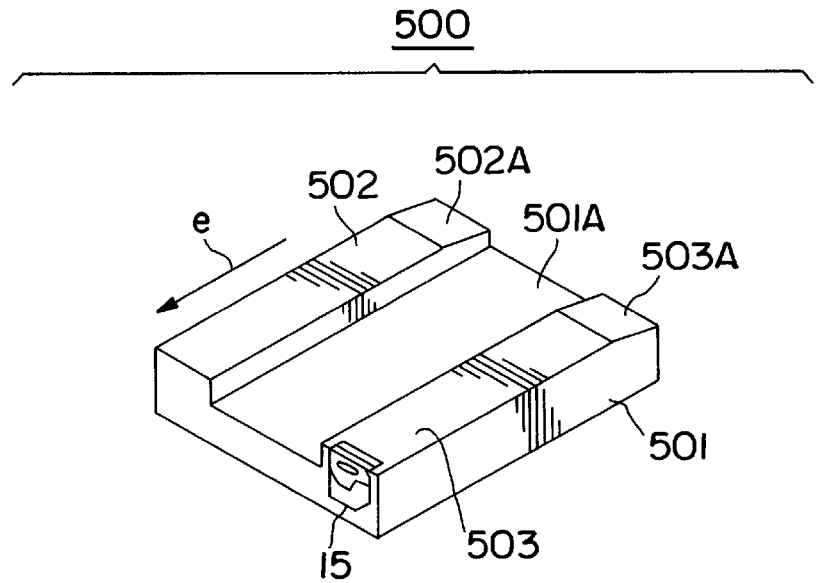
FIG. 4 is an explanatory view showing an air upstream direction in an air film bearing surface of the first conventional example of the magnetic head slider.

FIGS. 6(a) and 6(b) are a plan view and a perspective view of a first embodiment of the present invention.

Air film bearing surface 101 is the surface of a slider body 11 facing a recording medium (a magnetic disk) formed in a rectangular shape. In air film bearing surface 101, two V-shaped rail portions 12 and 13 are formed on the upstream stream side and the down stream side in the air flow direction, surrounding position W, the center of gravity (see FIG. 7). The air flow occurs between the recording medium and the air film bearing surface. The rail portions 12 and 13 have a V-shape and arc formed in symmetry, comprising convex portions (tip portions) 12a and 12b facing an air upstream end portion (a leading edge positioned at the top of FIG. 6) and concave portions (recessed portions) 101a and 101b facing air downstream end portion (a trailing edge at the bottom of FIG. 6).

Further, air upstream tapered plane (a tapered plane) 12a is formed in the leading edge portion of rail portion 12 positioned at the air upstream end portion. Further, a magnetic head 15 is provided in the region which extends over one end face of another rail portion 13 and an end face of the slider body 11, the rail portion 13 being positioned at the air downstream end portion (the trailing edge).

Figure 5:
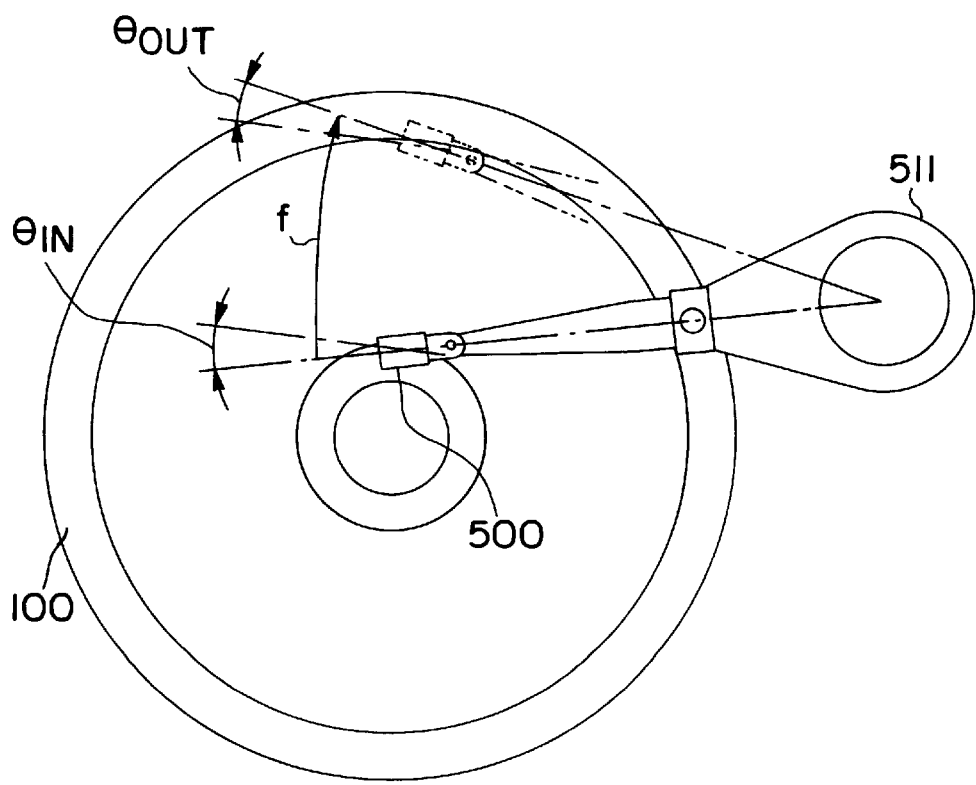
FIG. 5 is an explanatory view showing a method for moving a conventional magnetic head slider.

Magnetic head slider 10 is supported at its opposite surface (the rear surface of FIG. 6) to the air film bearing surface 101 by a magnetic head supporting mechanism 111 shown in 8 and is scanned over the recording medium 100. This magnetic head supporting mechanism 111 has a constitution similar to that of the conventional positioning mechanism 511 (see FIG. 5).

Reverse step surfaces are formed in the recessed regions 101a and 101b surrounded by the V-shaped rail portions 12 and 13, and negative pressure is generated on each of the reverse step surfaces respectively. Therefore, sucking forces act on the recording medium (the disk) at two locations, so that the pitch angle is kept at a comparatively stable state.

Figure 7:
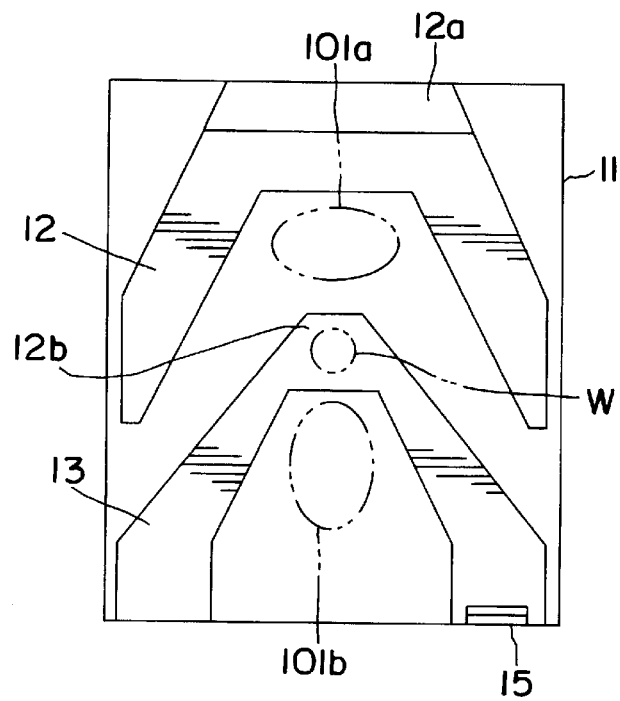
FIG. 7 is an explanatory view showing generation of a negative pressure portion on the air film bearing surface of the first embodiment.
Figure 8:
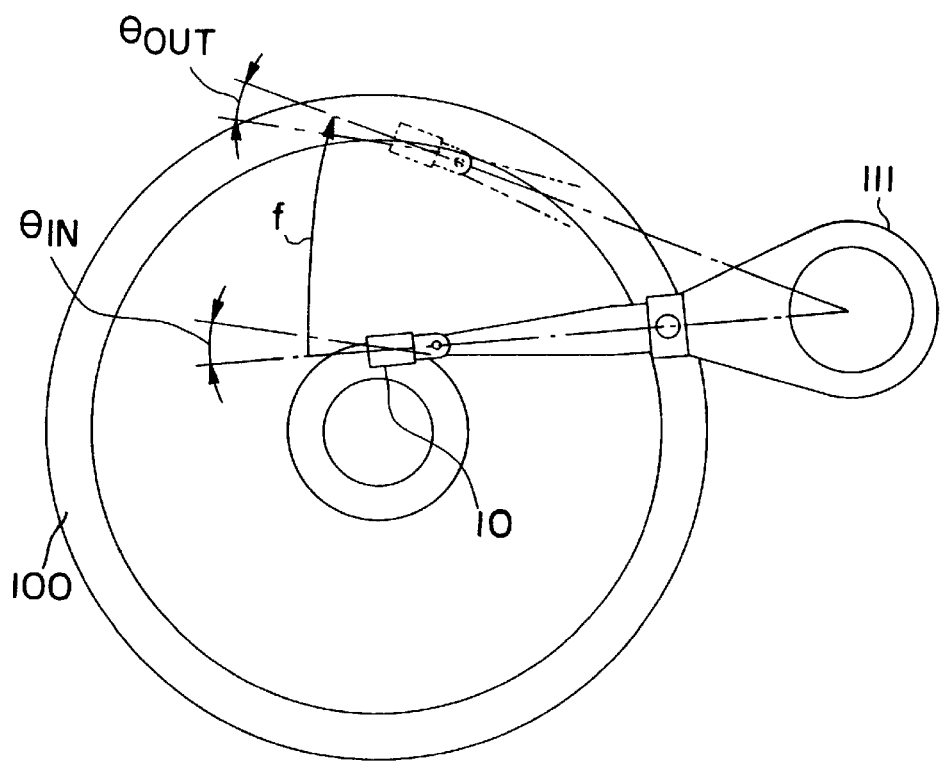
FIG. 8 is an explanatory view showing a method for moving the magnetic head slider of the first embodiment.

As shown in FIG. 7, in this embodiment, the recessed region 101a surrounded by the rail portion 12 on the air upstream side is formed so as to have a depth different from that of the recessed region surrounded by the rail portion 13 on the air downstream side. It should be noted that a depth means the depth in a plate thickness direction of the slider body 11 in this specification. In this embodiment, the depth of the recessed portions 101a surrounded by one rail portion 12 is formed deeper than that of the recessed region 101b surrounded by the other rail portion 13.

Figure 11A:
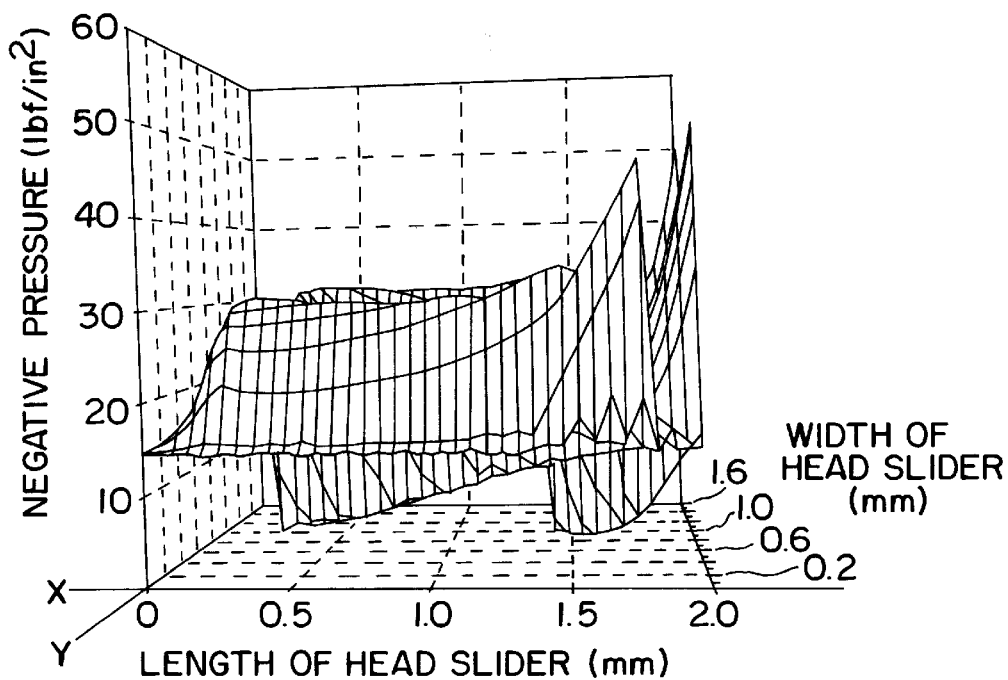
FIGS. 11(*a*) and 11(*b*) are views stereographic views showing pressure distribution. Specifically, FIG. 11(*a*) is a front view and FIG. 11(*b*) is a perspective view.
Figure 11B:
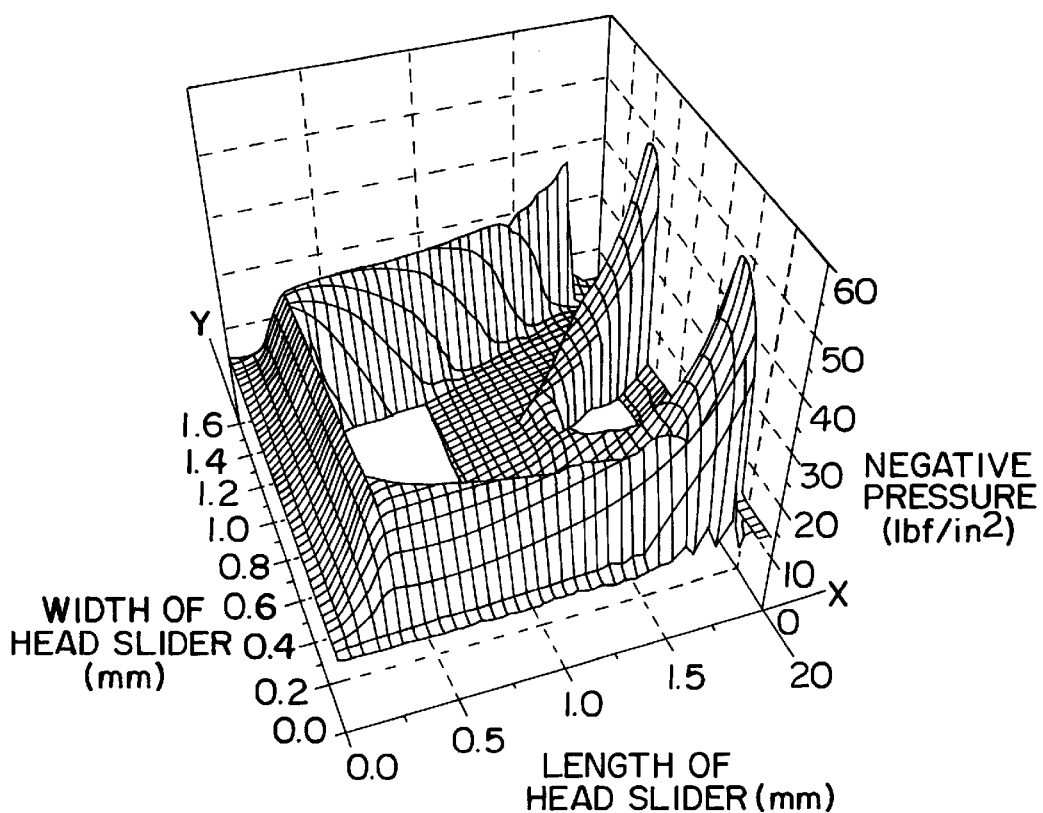

The negative pressure generated on the recessed regions 101a and 101b depends on air speed and the depth of the recessed region in the reverse step surface. The relation between these will be described with reference to FIGS. 9 to 11 below. FIGS. 9 to 11 show data concerning a magnetic head slider 20 of a second embodiment later described. However, the same results can be obtained by other magnetic head slider 10 of the first embodiment.

In FIG. 9, the negative pressure (the pressure per square inch) on each portion on the air film bearing surface in case of the peripheral speed of 5 mn/sec. is shown. Specifically, the left end portion of FIG. 9 corresponds to the air upstream end portion (the leading edge) of the magnetic head slider and the right end portion of FIG. 9 corresponds to the air downstream end portion (the trailing edge) thereof. Constant pressure lines are positioned substantially along the rail portions. FIG. 10 shows the negative pressure in case of the peripheral speed of 40 m/sec., in the same manner as that in FIG. 9. Moreover, FIG. 11 stereographically illustrates the data of FIG. 10.

Referring to FIGS. 9 to 11, the integration value of the negative pressure on the shallow recessed region 201b on the trailing edge side is smaller than the integration value of the negative pressure on the deep recessed region 201a on the leading edge side. The relative balances of the negative pressure are different between the shallow recessed region and the deep recessed region according to the peripheral speed. When the peripheral speed is slow, the negative pressure on the portion of the shallow recessed region is prone to be comparatively large and that on the portion of the deep recessed region is prone to be small. When the peripheral speed is high, the negative pressure on the portion of the shallow recessed region is prone to be comparatively small and that on the portion of the deep recessed region is prone to be large. It should be noted that the portions above the two rail portions 12 and 13 are positive pressure regions. Furthermore, the negative pressure tends to become large as the air flow speed is high. The air flow speed is large as the peripheral speed of the recording medium is high. Such trends are common to all embodiments of the present invention without limitation to the second embodiment.

In the magnetic head slider 10 of the first embodiment, the recessed region 101 a on the reverse step surface formed by one rail portion 12 on the leading edge portion is deep, and the recessed region 101b on the reverse step surface surrounded by the another rail portion 13 on the trailing edge side is shallow.

In case of the CSS (Contact Start Stop) method, the magnetic head slider is acted on by air flow generated by the rotation of the recording medium and becomes airborne using the air downstream side (the trailing side) as a fulcrum. When the magnetic head slider is set in motion, the air flow accelerates to a constant speed. In a transient state when the air flow speed is between 0 m/sec and 4–5 m/sec (constant speed in CSS zone), the magnetic head slider is not stable and may hit the disk. In order to reduce the take-off velocity of CSS method to shorten the time when the magnetic head slider may hit on the disk, pitch angle is made larger when the air flow speed is low in this transient state.

Figure 12A:
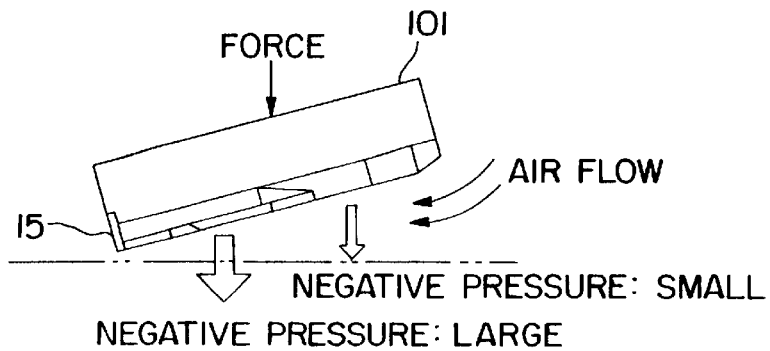
FIGS. 12(*a*) and 12(*b*) are views showing control of the pitch angle of the first embodiment. Specifically, FIG. 12(*a*) is an explanatory view showing control of the pitch angle at a low speed and FIG. 12(*b*) is an explanatory view showing control of the pitch angle at a high speed.
Figure 12B:
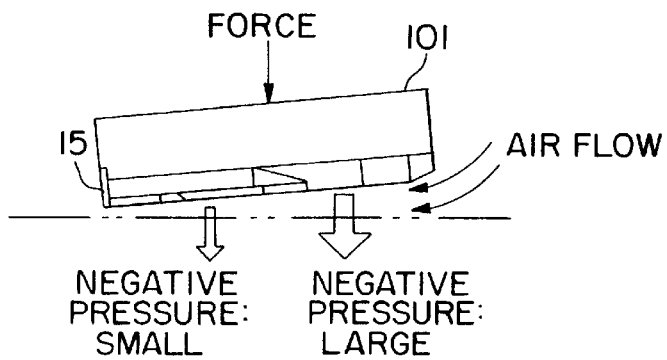

When the magnetic head slider flies in the constant state, the flow speed is low in the inner periphery portion and the flow speed is high in the outer periphery portion. In this embodiment, since a larger negative pressure occurs on the trailing side than on the center of gravity of the slider in the position where the flow speed (the peripheral speed) of the recording medium is low, a force to increase the flying pitch angle is applied as shown in FIG. 12(a). On the other hand, in the position where the flow speed is high such as the outer periphery of the track, a larger negative pressure occurs on the leading edge side than on the center of gravity of the slider. Thus, a force to reduce the flying pitch angle is applied. Therefore, variations in the flying pitch angle in accordance with the flow speed are canceled by the balance of the negative pressure generated on both recessed regions, thereby reducing the variations in the pitch angle.

As described above, according to the first embodiment, the increase in the pitch angle in the high speed region (the outer periphery of the track) of the air flow can be suppressed whereby occurrence of hitting of the magnetic head against the magnetic disk can be suppressed. Furthermore, the pitch angle in the low speed region (the inner periphery of the track) of the air flow is made larger whereby the take-off characteristic can be improved. Then, the variations of the flying pitch angle according to the variations of the air flow speed can be made smaller so that the dependency of the flying height on the peripheral speed is reduced and the flying height of the magnetic head slider made constant.

Figure 13:
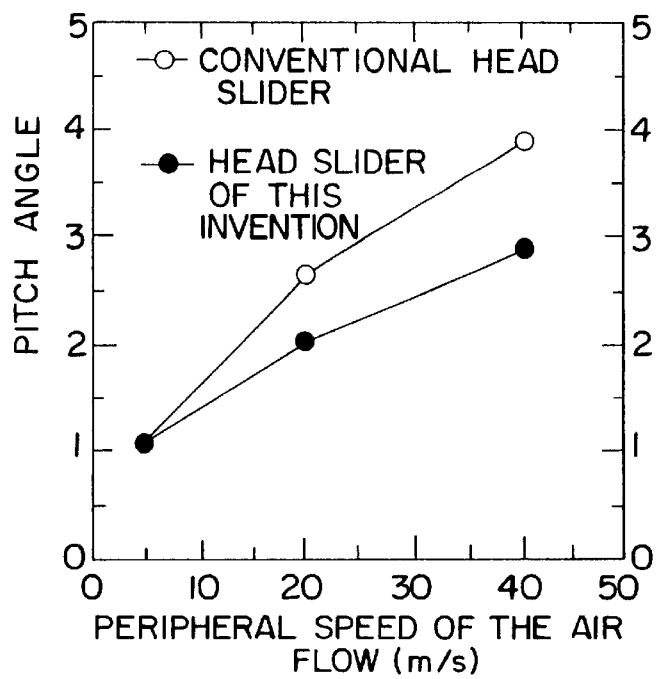
FIG. 13 is a graph showing a comparison of variations of the pitch angle of the first embodiment with those of the conventional example.

In FIG. 13, the relationship between the peripheral speed of the air flow and the pitch angle of the conventional magnetic head slider is illustrated, assuming the pitch angle at a low speed region (the position at the innermost periphery of the track) to be 1. Furthermore, the relationship between the peripheral speed of the air flow and the pitch angle of the first embodiment is also illustrated in FIG. 13, assuming the pitch angle in the low speed region (the position at the innermost periphery of the track) to be 1. When the first embodiment is compared with the conventional example, it is found that the variation in the pitch angle is smaller in the first embodiment than in the conventional example. Specifically, in the first embodiment, it is shown that when the dependency of the flying angle on the peripheral speed is reduced the flying angle is stabilized.

In the first embodiment, the V-shaped rail portions 12 and 13 are provided. But the construction in which U-shaped rail portions are provided may be adopted, and the leading angle and length of the rail portions need to be determined.

The lengths L1 and L2 of the rail portions 12 and 13 in the direction of the air flow (side lengths) (see FIG. 6) are determined by balancing the required negative pressure and the pitch angle to be actually controlled. Specifically, according to the result empirically obtained by the applicant of the present invention, in case it is desired to control the pitch angle by generating larger negative pressure, the side length L1 of the rail portion 12 must be ½ to ⅔ of the length of the slider and the recessed region 101a on the leading edge side must be set wider to secure sufficient negative pressure. In case where it is intended to improve flying characteristics, the side length L1 of the rail portion 12 should be below ½ of the slider and the side length L2 of the other rail portion 13 should be long in order to set the recessed region 101b on the trailing edge side wide. In a case where the flying height is about 40 to 50 nm at the flow speed of about 10 to 40 m/s, the depth of the deep recessed region 101b should be about 6 to 8 μm and the depth of the shallow recessed region 101b should be about 2 to 3 μm.

It should be noted that these measurements are properly set according to design parameters such as slider measurement, pressure load, gap flying height, or recording medium rotation speed.

Figure 14:
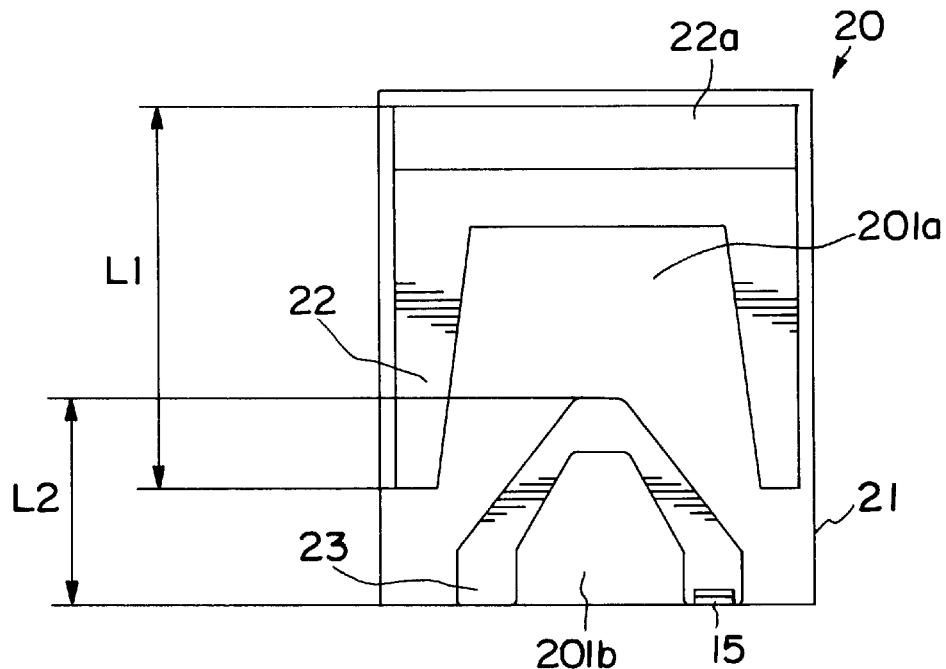
FIG. 14 is a plan view showing a second embodiment of a magnetic head slider of the present invention.

FIG. 14 is a plan view of the magnetic head slider 20 of a second embodiment of the present invention. In this embodiment, a U-shaped rail portion 22 is provided on the leading edge side, and a small V-shaped rail portion 23 is provided on the trailing edge side. Then, an air upstream tapered surface 22a is provided on the leading edge side and a magnetic head 15 is provided on the trailing edge side. In each of recessed regions 201a and 201b, a reverse step surface is formed whereby negative pressure is generated. In order to control pitch angle, a U-shaped rail is adopted for the rail portion 22 on the leading edge side so that a large negative pressure integration value can be obtained over a wider area in the recessed region 201a on the leading edge (the air upstream end portion) side. On the other hand, a V-shaped rail is adopted for the rail portion 23 on the trailing edge (the air downstream end portion) side. The side length L1 of the rail portion 22 is set at more than ⅔ of the slider length in order to produce larger negative pressure on the leading edge side, and the side length L2 of the other rail portion 23 is set shorter in order to limit the negative pressure on the recessed region 201b on the trailing edge side. For this reason, the other rail portion 23 does not extend to the end surface of the slider body 21 in the width direction. This construction can be applicable when the position of the gap can be designed comparatively freely.

Figure 15:
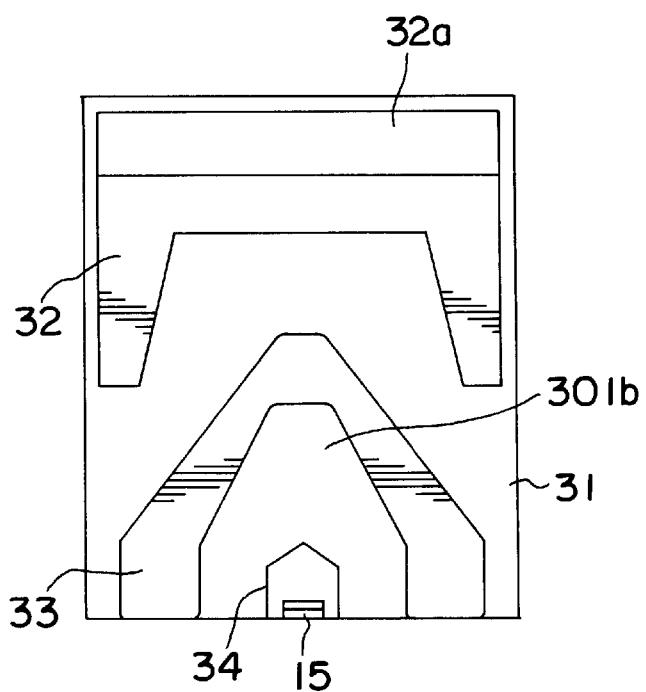
FIG. 15 is a plan view showing a third embodiment of a magnetic head slider of the present invention.

FIG. 15 is a plan view of a third embodiment of the present invention. Like the second embodiment, a U-shaped rail portion 32 is provided on the leading edge side, and a small V-shaped rail portion 33 is provided on the trailing edge side. Here, an air upstream tapered surface 32a is provided on the leading edge side.

A magnetic head slider 31 of this embodiment is a slider of the center gap type, in which a center rail 34 is formed in a recessed region 301b on the trailing edge side and a magnetic head portion 15 is formed. In this case, since positive pressure is generated on the center rail 34 so the flying height increases, the width of the other rail portion 33 on the trailing edge side should be narrow, whereby the positive pressure generated on the other rail portion 33 is limited.

When it is intended to generate a larger negative pressure, it is more desirable to use a U-shaped rail. When the rail is used in a low flying region where adhesion of dust is a problem, it is more desirable to use a V-shaped rail.

Figure 16A:
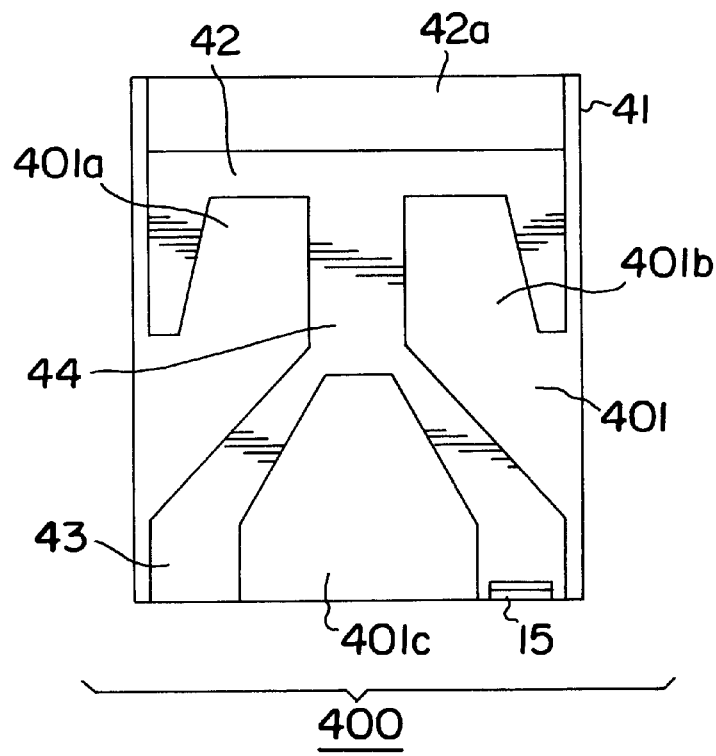
FIGS. 16(*a*) and 16(*b*) are views showing a fourth embodiment of the present invention. Specifically, FIG. 16(*a*) is a plan view from the air bearing surface side and FIG. 16(*b*) is a perspective view of FIG. 16(*a*).
Figure 16B:
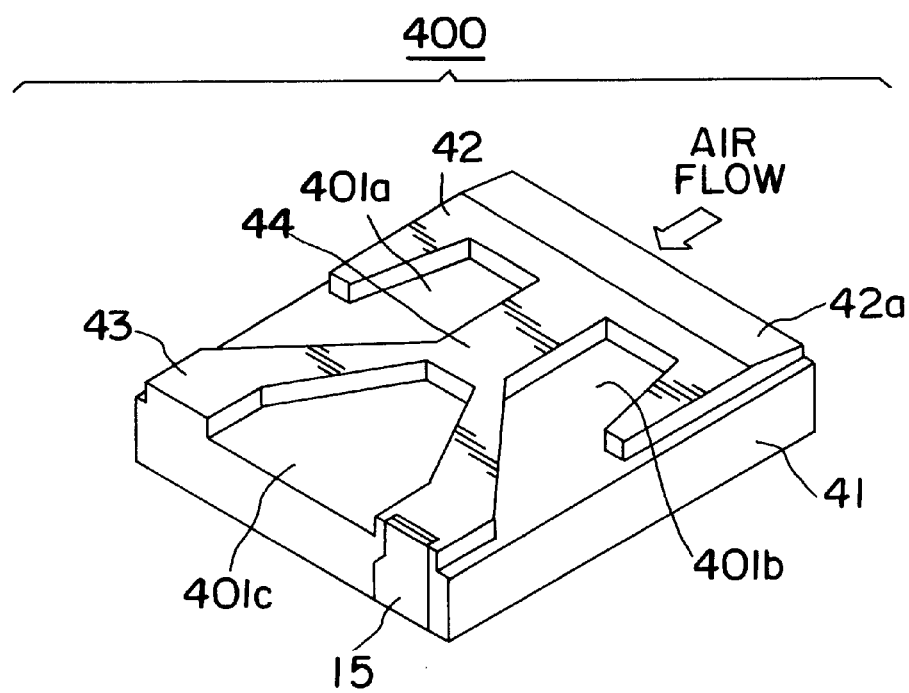

Next, descriptions for a fourth embodiment will be made with reference to FIGS. 16(a) and 16(b). On an air film bearing surface 401 of a slider body 41 of a magnetic head slider 400, a U-shaped rail portion 42 and V-shaped rail portion 43 are provided. Both of the rail portions 42 and 43 are formed so as to interpose a center position W of gravity of the slider therebetween, in the upper and down stream sides in the air flow direction. Each of the rail portions 42 and 43 has such a constitution that a V or U-shaped convex portion thereof which faces the air upstream side end portion (the leading edge at the top of FIG. 16) and a concave portion thereof faces the air downstream side end portion (the trailing edge at the bottom of FIG. 16). The rail portions 42 and 43 are formed in symmetry with respect to the air flow direction, respectively. In the leading edge portion of one rail portion 42, an air upstream tapered surface 42a is provided. In the other rail portion 43, a magnetic head portion 15 is provided.

Then, a center of one rail portion 42 and a center of the other rail portion 43 are connected with a connecting rail portion 44 balances each of the points where negative pressure occurs.

The magnetic head slider 400 has an air bearing surface 401 like the first embodiment, flying over the magnetic disk on the air film bearing surface.

Figure 17:
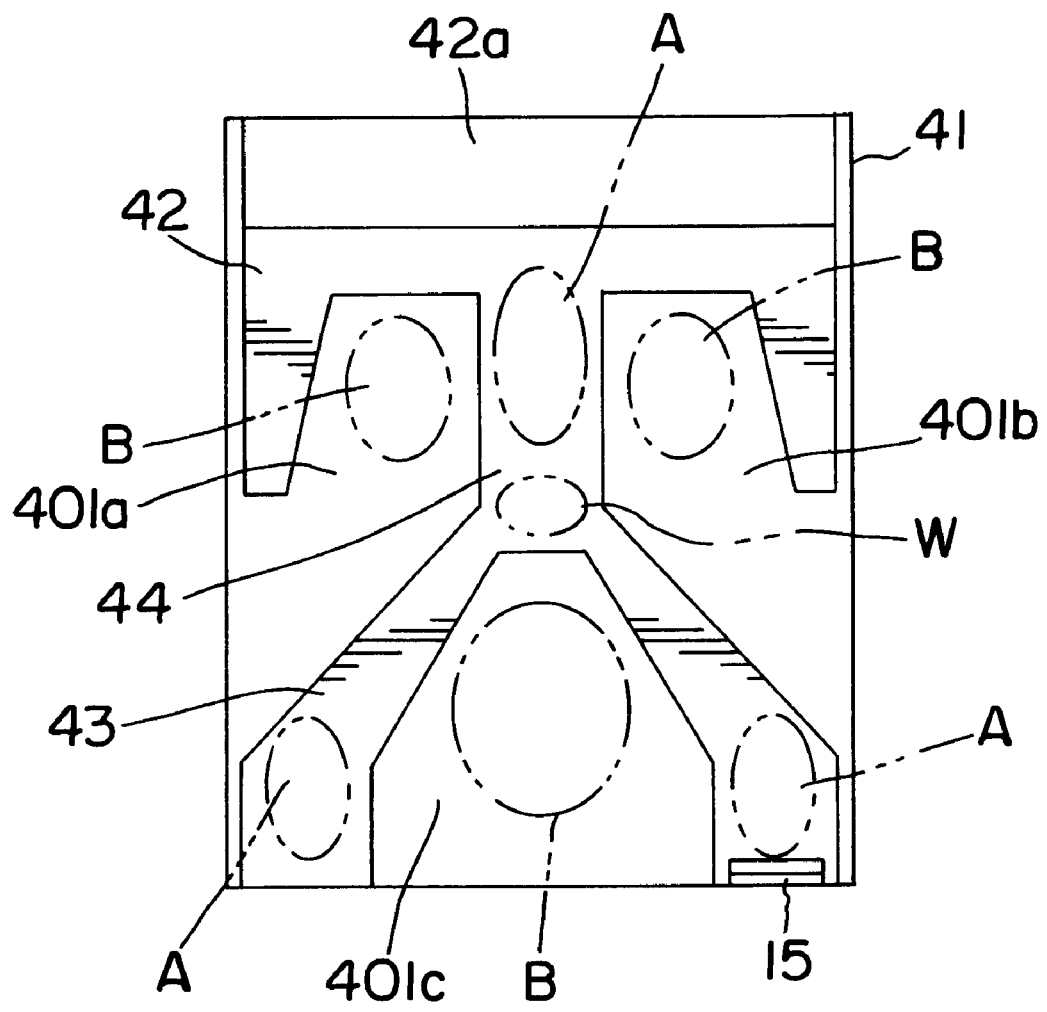
FIG. 17 is an explanatory view showing generation of negative pressure on the air film bearing surface of the fourth embodiment.

In case of the fourth embodiment, the recessed region on the leading edge side surrounded by the rail portion 42 is divided into left and right portions whereby two recessed regions 401a and 401b (see FIG. 17) are formed. For this reason, as shown in FIG. 17, the recessed regions 401a and 401b, each being separately independently from one another interposing the position W of a center of gravity of the slider, are present on the leading edge side. The recessed region 401c is present at a center of the trailing edge side independently from other recessed regions. Thus, peaks of negative pressure occur at three points B (see FIG. 17) whereby a triangle is formed to produce a good balance.

At the same time, the positive pressure region on the rail portion is divided into three points A (see FIG. 17) with a good balance so that a triangle is formed at a center portion of the leading edge side and left and right end portions of the trailing edge side. The center of the triangle corresponds to the position W which is a center of gravity of the slider. Therefore, a center of total loads is formed near the position W of the center of gravity so that the flying height of the slider body 41 is stabilized.

Furthermore, since negative pressure occurs on each of the recessed regions 401a, 401b and 401c and the negative pressure regions are three in number, unevenness of the negative pressure distribution is dispersed so that total balance is enhanced. Thus, the dependency of the flying height on peripheral speed can be suppressed. Even in the position where the yaw angle is large like the outer periphery of the track, the negative pressure distribution never largely deviates. As a result, even when the yaw angle becomes large, variations in the roll angle of the slider body 41 can be suppressed whereby flying is stabilized.

Figure 18A:
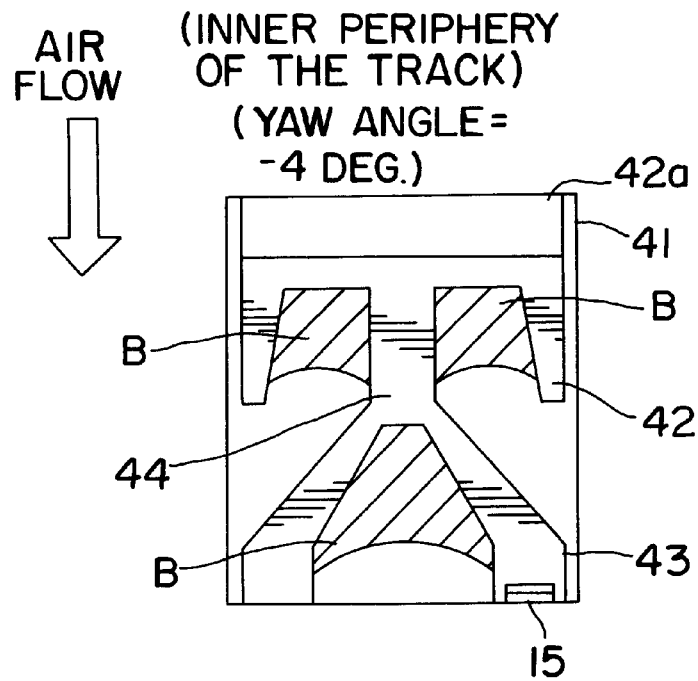
FIGS. 18(*a*) and 18(*b*) are views showing, generation of negative pressure of the fourth embodiment. Specifically, FIG. 18(*a*) is an explanatory view in case where the slider is positions in an inner periphery of a track (the yaw angle is −4 degrees)
FIG. 18(b) is an explanatory view in case where the slider is positioned in an outer periphery of the track (the yaw angle is +19 degrees).
Figure 18B:
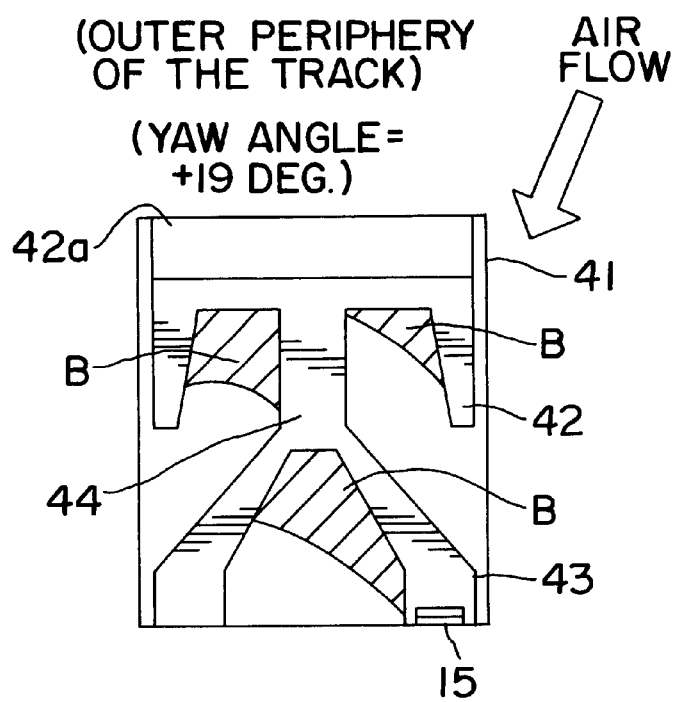
Figure 19A:
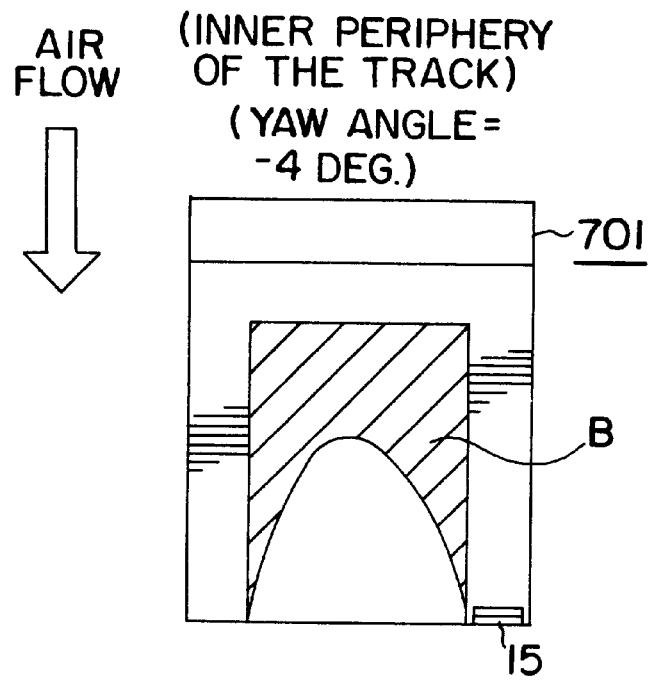
FIGS. 19(a) and 19(b) are views showing generation of negative pressure of the third conventional example. Specifically.
Figure 19B:
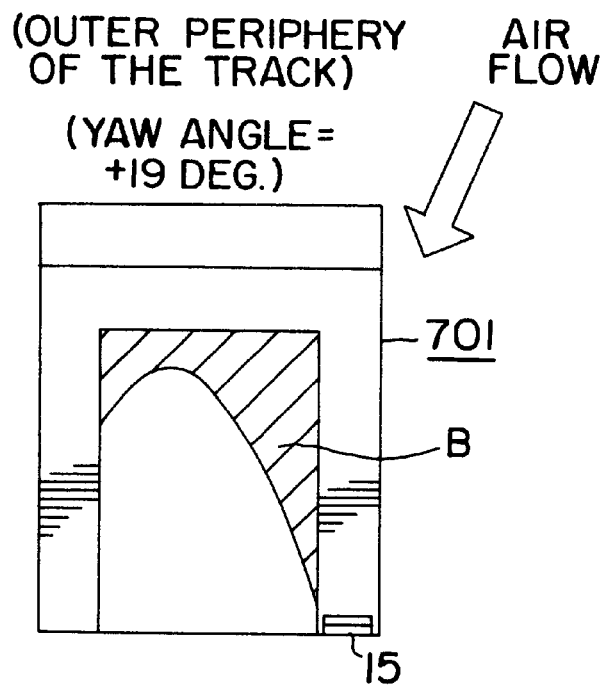

FIG. 18(a) is a view showing a state of negative pressure portion B occurring on each recessed region when the slider body 41 is positioned in the inner periphery portion of the track (the yaw angle: −4 degrees). Furthermore, FIG. 18(b) is a view showing a state of the negative pressure portion B occurring when the slider body 41 is positioned in the outer periphery portion of the track (the yaw angle: +19 degrees). Moreover, FIG. 19 is a view showing the state of negative pressure on negative pressure portion B of a conventional magnetic head slider 701(see FIG. 3) formed with a single U-shaped rail portion 72. FIG. 19(a) shows a case where the yaw angle is −4 degree, and FIG. 19(b) shows a case where the yaw angle is +19 degrees. Referring to FIG. 19, it is shown that the negative pressure portions B are generated unevenly as the yaw angle becomes large. Therefore, variations in the roll angle is large, and the flying of the slider body 41 is prone to be unstable. On the contrary, in case of this embodiment shown in FIG. 18, even when the yaw angle is large, the negative pressure portion B is not so uneven. Therefore, variations in the float roll angle are small so that the flying of the slider body 41 is stabilized.

Figure 20:
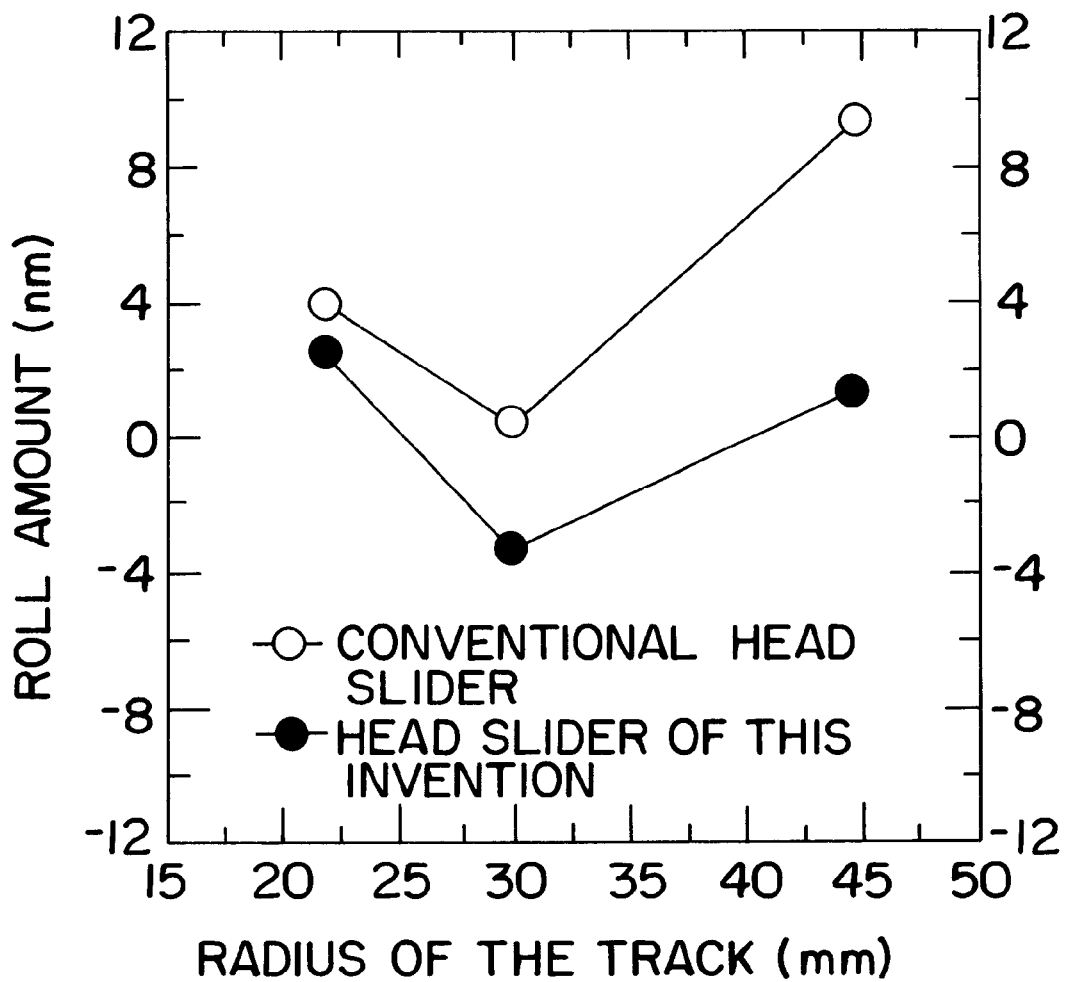
FIG. 20 is a graph comparing variations of flying roll relative to the position of the slider (track radius) with those of the third conventional example.

FIG. 20 is a graph showing the result of comparison of an occurrence state of the negative pressure portion in the conventional example shown in FIG. 19 with that of the embodiment shown in FIG. 18. According to the graph of FIG. 20, in this embodiment, variations in roll amount can be stably suppressed. In case of low flying height, good HDI (Head-Disk Interface) reliability can be obtained.

In this embodiment, the depths of the three recessed regions individually separated each other are adjusted so as to be different from one another, whereby the flying height of the magnetic head slider can be more precisely adjusted. For example, for the two recessed regions 401a and 401b formed on the left and right sides on the leading edge side and the recessed region 401c formed on the triangle edge side, the recessed region 401a on the inner periphery side of the track is made shallower than the recessed region 401b formed on the outer periphery side. Further the recessed region 401c in the central portion on the trailing edge side is made shallower than that of the region 401b, and the negative pressures occurring at three points are balanced, whereby variations in the pitch angle and the flying roll pitch angle owing to variations in air flow and yaw angle can be suppressed to be smaller.

When the V-shaped rail is used for the rail portion 42 on the leading edge side, there is not a sufficiently wide negative pressure region for the recessed regions 401a and 401b separate left and right. Therefore, a U-shaped rail should be used for the rail portion 42 on the leading edge side. Furthermore, the positive pressure occurring in the connecting rail 44 is not so large that the slider flying is affected so much. Therefore, there are no limitations about the width as long as the connection rail 44 has an ability to separate the negative pressure region.

Figure 21:
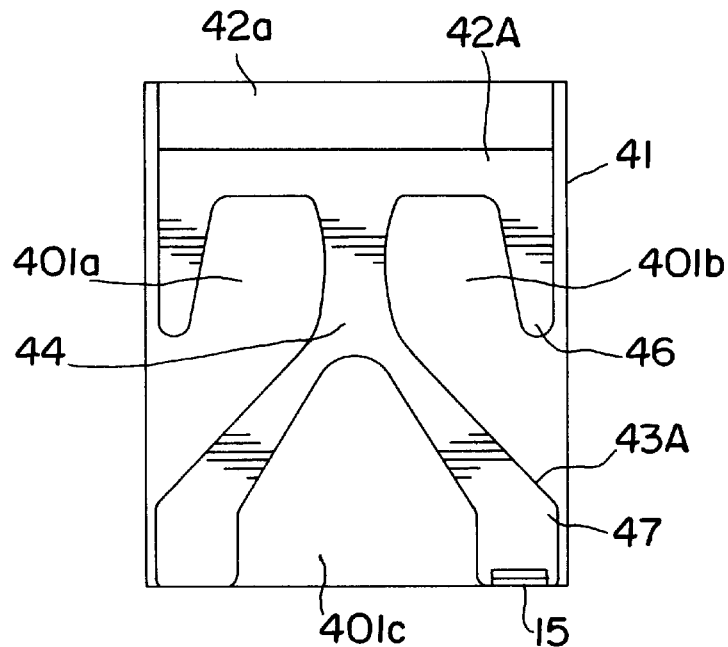
FIG. 21 is a plan view showing a fifth embodiment of a magnetic head slider of the present invention.

FIG. 21 is a plan view of a fifth embodiment of the present invention. In this embodiment, corners of end portions 46 and bent portions 47 of the rail portions 42A and 43A are rounded, whereby disturbance of air flow due to the rail portions is avoided. The rest of the construction of the fifth embodiment is the same as that of the fourth embodiment. Therefore, the same reference numerals are given to those and descriptions for them will be omitted.

Similar to the fourth embodiment, in this embodiment, three recessed regions individual separated from each other are provided and the flying pitch angle and the flying roll angle are adjusted. To be specific, the depth of the recessed region 401c on the trailing edge side is made shallower than other recessed portions 401a, 401b, whereby controlling for the pitch angles of the slider 41 can be performed. Furthermore, the depths of the recessed regions 401a and 401b on the leading edge side can be made different in order to control negative pressure on the left and right recessed regions on the leading edge side. Thus, the flying roll angle can be controlled. In general, as for the depths of the recessed regions 401a and 401b, the recessed region on the outer periphery side of the tracks should be made deeper than that on the inner periphery side of the tracks.

Figure 22:
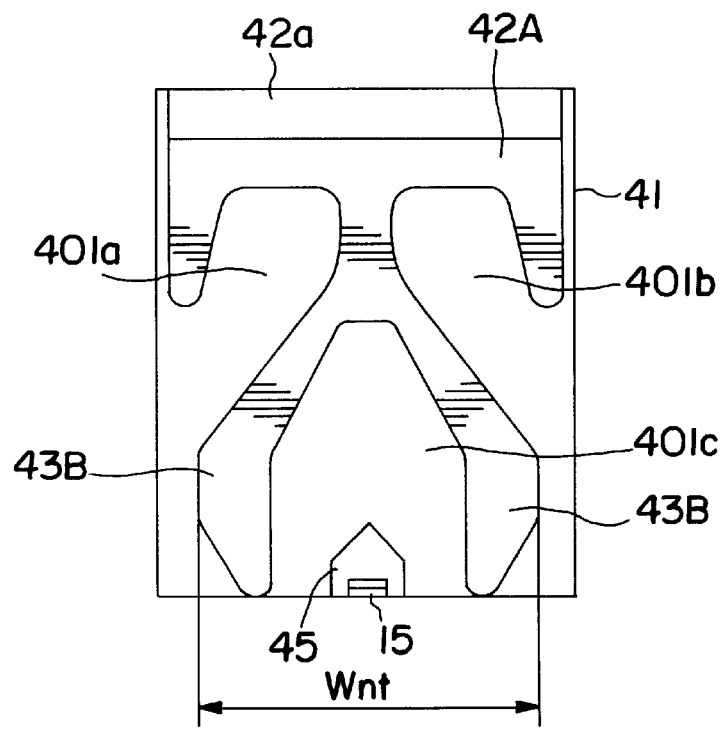
FIG. 22 is a plan view showing a sixth embodiment of a magnetic head slider of the present invention.

FIG. 22 is a plan view of a sixth embodiment of the present invention. The sixth embodiment is concerned with a center gap type slider, in which a center rail 45 is formed in a recessed region 401c on the trailing edge side and a magnetic head portion 15 is provided on the center rail 15. With such a construction, since the flying height increases owing to positive pressure or the center rail 45, the interval Wnt (see FIG. 22) of the other rail portions 43B, 43B on the trailing edge should be narrow. Furthermore, since the positive pressure region on the trailing edge side becomes large due to this center rail 45, in order to balance, the interval of an end surface of the other rail portion 43B on the trailing edge side is formed to be narrow. Therefore, to meet with the width thereof, each portion is adjusted. Other constructions are the same as those of the fifth embodiment. The same reference numbers are given to them and descriptions of them are omitted.

In the present invention, since a negative pressure is generated on the leading edge side and the trailing edge side on the air film bearing surface and the negative pressure portions occur at more than two locations, it is possible to reduce the dependency of the flying height of the slider body on the peripheral speed and to maintain a constant flying angle. Furthermore, by changing the depth or shape of the recessed region on which negative pressure generated, the negative pressure is controlled whereby the flying angle can be more stabilize and good flying characteristics can be obtained. For this reason, it is possible to perform stable CDR (Constant Density Recording) all over the disk. Furthermore, the present invention is capable of providing a magnetic head slider which can reduce wear in the low speed CSS (Contact Start Stop) method and increase the HDI (Head-Disk Interface) reliability.

Although the preferred embodiment of the present invention has been described in detail, it should be understood that various changes, substitutions and alternations can be made therein without departing from spirit and scope of the inventions as defined by the appended claims.

What is claimed is:

1. A magnetic head slider comprising:
   an air film bearing surface facing a recording medium; and
   upstream and downstream rail portions each having a U-shape and/or V-shape formed on an air upstream side and an air downstream side of said air film bearing surface respectively, both said rail portions being rigidly and fixedly positioned in direct contact with said air film bearing surface and having a convex portion facing said air upstream side and a recessed region facing said air downstream side, said recessed region of said rail portion on said air upstream side being deeper than said recessed region of said rail portion on said air downstream side, wherein the convex portion of said downstream rail portion extends into the recessed region of said upstream rail portion.

2. The magnetic head slider according to claim 1, wherein the center of gravity of said magnetic head slider is located between a negative pressure portion of said recessed region of said rail portion on said air upstream side and a negative pressure portion of said recessed region of said rail portion on said air downstream side.

3. The magnetic head slider according to claim 2, wherein said rail portion on said air upstream side is longer than said rail portion on said air downstream side.

4. The magnetic head slider according to claim 2, wherein said rail portion on said air upstream side is wider than said rail portion on said air downstream side.

5. The magnetic slider according to claim 2, wherein said rail portions are substantially perpendicular to an air flow.

6. The magnetic head slider according to claim 2, further comprising a connecting rail portion for connecting said rail portion on said air upstream side to said rail portion on said air downstream side.

7. The magnetic head slider according to claim 2, wherein said rail portion formed on the downstream side has a corner portion in the form of a rounded curved surface.

8. The magnetic head slider according to claim 1, wherein said rail portion on said air upstream side is longer than said rail portion on said air downstream side.

9. The magnetic head slider according to claim 8, wherein said rail portion on said air upstream side is wider than said rail portion on said air downstream side.

10. The magnetic head slider according to claim 8, further comprising a connecting rail portion for connecting said rail portion on said air upstream side to said rail portion on said air downstream side.

11. The magnetic head slider according to claim 1, wherein said rail portion on said air upstream side is wider than said rail portion on said air downstream side.

12. The magnetic slider according to claim 11, wherein said rail portions are substantially perpendicular to an air flow.

13. The magnetic head slider according to claim 11, further comprising a connecting rail portion for connecting said rail portion on said air upstream side to said rail portion on said air downstream side.

14. The magnetic slider according to claim 1, wherein said rail portions are substantially perpendicular to an air flow.

15. The magnetic head slider according to claim 14, further comprising a connecting rail portion for connecting said rail portion on said air upstream side to said rail portion on said air downstream side.

16. The magnetic head slider according to claim 1, further comprising a connecting rail portion for connecting said rail portion on said air upstream side to said rail portion on said air downstream side.

17. The magnetic head slider according to claim 1, wherein said rail portion formed on the downstream side has a corner portion in the form of a rounded curved surface.

18. A magnetic head slider comprising:
    an air film bearing surface facing a recording medium; and
    at least two rail portions having a U-shape and/or V-shape formed on an air upstream side and an air downstream side of said air film bearing surface respectively, both said rail portions being rigidly and fixedly positioned in direct contact with said air film bearing surface and having a convex portion facing said air upstream side and a recessed region facing said air downstream side, wherein said rail portion on said air upstream side is wider than said rail portion on said air downstream side, and wherein said recessed region of said rail portion on said air upstream side being deeper than said recessed region of said rail portion on said air downstream side.

19. The magnetic head slider according to claim 18, wherein the center of gravity of said magnetic head slider is located between a negative pressure portion of said recessed region of said rail portion on said air upstream side and a negative pressure portion of said recessed region of said rail portion on said air downstream side.

20. The magnetic head slider according to claim 19, wherein said rail portion on said air upstream side is longer than said rail portion on said air downstream side.

21. The magnetic head slider according to claim 18, wherein said rail portion on said air upstream side is longer than said rail portion on said air downstream side.

22. The magnetic slider according to claim 18, wherein said rail portions are substantially perpendicular to an air flow.

23. The magnetic head slider according to claim 18, further comprising a connecting rail portion for connecting said rail portion on said air upstream side to said rail portion on said air downstream side.

24. The magnetic head slider according to claim 18, wherein said rail portion formed on the downstream side has a corner portion in the form of a rounded curved surface.

25. A magnetic head slider comprising:
    an air film bearing surface facing a recording medium;
    upstream and downstream rail portions each having a U-shape and/or V-shape formed on an air upstream side and an air downstream side of said air film bearing surface respectively, each of said rail portions being rigidly and fixedly positioned in direct contact with said air film bearing surface and having a convex portion facing said air upstream side and a recessed region facing said air downstream side, wherein the convex portion of said downstream rail portion extends into the recessed region of said upstream rail portion;

a connecting rail portion for connecting said rail portion on said air upstream side to said rail portion on said air downstream side so that the recessed region of said upstream rail portion is divided into first and second recessed portions; and wherein each of the first and second recessed portions and the recessed region of the downstream rail portion has a different depth.

* * * * *